United States Patent
Rahmouni et al.

(10) Patent No.: US 12,289,530 B1
(45) Date of Patent: Apr. 29, 2025

(54) IMAGE CAPTURE DEVICE FOR GENERATING PANORAMAS WHILE RECORDING VIDEO

(71) Applicant: GoPro, Inc., San Mateo, CA (US)

(72) Inventors: Nicolas Rahmouni, Paris (FR); Vincent Riauté, Carrières sous Poissy (FR); Marc Lebrun, Issy-les-Moulineaux (FR); Michel Auger, Paris (FR)

(73) Assignee: GoPro, Inc., San Mateo, CA (US)

( * ) Notice: Subject to any disclaimer, the term of this patent is extended or adjusted under 35 U.S.C. 154(b) by 32 days.

(21) Appl. No.: 18/192,445

(22) Filed: Mar. 29, 2023

(51) Int. Cl.
*H04N 23/698* (2023.01)
*H04N 23/63* (2023.01)
*H04N 23/68* (2023.01)

(52) U.S. Cl.
CPC ......... *H04N 23/698* (2023.01); *H04N 23/632* (2023.01); *H04N 23/6811* (2023.01); *H04N 23/6815* (2023.01)

(58) Field of Classification Search
None
See application file for complete search history.

(56) References Cited

U.S. PATENT DOCUMENTS

| | | | | |
|---|---|---|---|---|
| 2014/0168356 A1* | 6/2014 | Francois | ............... | G03B 7/02 |
| | | | | 348/37 |
| 2019/0356853 A1* | 11/2019 | Lee | ............... | H04N 23/667 |
| 2022/0132031 A1* | 4/2022 | Huang | ............... | H04N 23/631 |
| 2022/0385814 A1* | 12/2022 | Hwang | ............... | H04N 23/64 |

* cited by examiner

*Primary Examiner* — Rebecca A Volentine
(74) *Attorney, Agent, or Firm* — Esplin & Associates, PC

(57) ABSTRACT

An image capture device may capture visual content of a video during a capture duration. The image capture device may be panned during the capture duration. Panning of the image capture device may be detected and a panoramic image may be automatically generated using the visual content captured during panning of the image capture device.

20 Claims, 9 Drawing Sheets panoramic image 600

IMAGE CAPTURE DEVICE FOR GENERATING PANORAMAS WHILE RECORDING VIDEO

FIELD

This disclosure relates to an image capture device that automatically generates panoramic images during video capture.

BACKGROUND

A panoramic image of a scene provides a large field of view of a scene. Manually generating a panoramic image may be difficult or cumbersome. For example, a user may need to capture many images of a scene and process them using a specific software to generate the panoramic image, or use a specific mode on an image capture device that asks the user to perform specific motion with the image capture device to generate the panoramic image.

SUMMARY

This disclosure relates to generating panoramas while recording videos. An image capture device may include one or more of an image sensor, an optical element, a rotational position sensor, a processor, and/or other components. The image sensor may generate a visual output signal conveying visual information based on light that becomes incident thereon. The visual information may define visual content. The optical element may guide light within a field of view to the image sensor. The rotational position sensor may generate a rotational position output signal conveying rotational position information. The rotational position information may characterize rotational position of the image capture device. The visual content may be captured during a capture duration. A video may be generated based on the visual content captured during the capture duration and/or other information. A panning motion of the image capture device during a period within the capture duration may be detected based on the rotational position information and/or other information. Responsive to detection of the panning motion of the image capture device during the period within the capture duration, a panoramic image may be generated based on the visual content captured during the period within the capture duration and/or other information.

A housing may carry one or more components of the image capture device. The housing may carry (be attached to, support, hold, and/or otherwise carry) one or more of an image sensor, an optical element, a rotational position sensor, a processor, an electronic storage, and/or other components. In some implementations, the housing may carry one or more electronic displays.

The electronic storage may store information relating to an image capture device, information relating to visual content, visual information, information relating to capture of the visual content, information relating to panning motion, information relating to panoramic images, and/or other information.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may have a size. The field of view may be less than 180 degrees. The field of view may be equal to 180 degrees. The field of view may be greater than 180 degrees.

The rotational position sensor may be configured to generate a rotational position output signal and/or other output signals. The rotational position output signal may convey rotational position information. The rotational position information may characterize rotational position of the image capture device.

The processor(s) may be configured by machine-readable instructions.

Executing the machine-readable instructions may cause the processor(s) to facilitate generating panoramas while recording videos. The machine-readable instructions may include one or more computer program components. The computer program components may include one or more of a capture component, a panning motion component, a panorama component, and/or other computer program components.

The capture component may be configured to capture the visual content during a capture duration. One or more videos may be generated based on the visual content captured during the capture duration and/or other information.

The panning motion component may be configured to detect a panning motion of the image capture device during a period within the capture duration. The panning motion of the image capture device may be detected based on the rotational position information and/or other information.

In some implementations, detection of the panning motion of the image capture device during the period within the capture duration based on the rotational position information may include: determination of a change in a pointing direction of the optical element during the period based on the rotational position information and/or other information; determination of an increase in a total field of view of the visual content captured during the period based on the change in the pointing direction of the optical element and/or other information; and detection of the panning motion of the image capture device based on the increase in the total field of view of the visual content captured during the period and/or other information.

In some implementations, the panning motion of the image capture device may be detected based on the increase in the total field of view of the visual content captured during the period satisfying a panning motion field of view criteria. The increase in the total field of view of the visual content captured during the period may satisfy the panning motion field of view criteria based on the total field of view of the visual content captured during the period being increased to a panning motion field of view threshold.

In some implementations, detection of the panning motion of the image capture device during the period within the capture duration based on the rotational position information may include: determination of a change in a pointing direction of the optical element during the period based on the rotational position information and/or other information; and detection of the panning motion of the image capture device based on an extent of the change in the pointing direction of the optical element during the period satisfying a panning motion extent threshold.

The panorama component may be configured to, responsive to detection of the panning motion of the image capture device during the period within the capture duration, generate one or more panoramic images. The panoramic image(s) may be generated based on the visual content captured during the period within the capture duration and/or other information.

In some implementations, the visual content captured during the period may be stored within one or more buffers.

In some implementations, generation of the panoramic image(s) may not be performed based on detection of motion blur within the visual content captured during the period within the capture duration and/or other information. In some implementations, generation of the panoramic image(s) may not be performed based on detection of local motion within the visual content captured during the period within the capture duration and/or other information.

In some implementations, one or more previews of the panoramic image(s) may be presented on the electronic display(s) during generation of the panoramic image(s).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
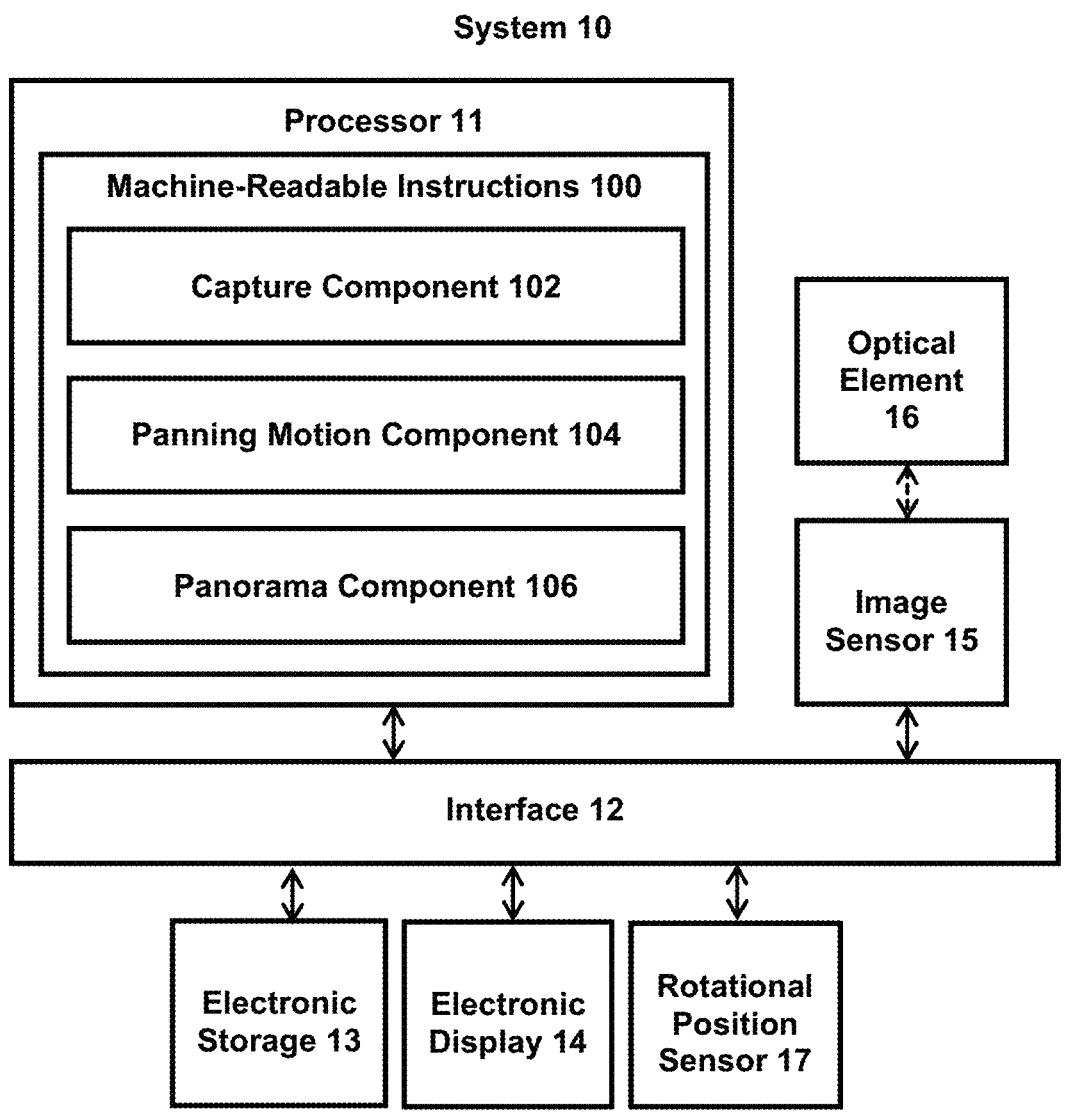
FIG. 1 illustrates an example system for generating panoramas while recording videos.

FIG. 1 illustrates a system 10 for generating panoramas while recording videos. The system 10 may include one or more of a processor 11, an interface 12 (e.g., bus, wireless interface), an electronic storage 13, an electronic display 14, an image sensor 15, an optical element 16, a rotational position sensor 17, and/or other components. The image sensor 15 may generate a visual output signal conveying visual information based on light that becomes incident thereon. The visual information may define visual content. The optical element 16 may guide light within a field of view to the image sensor 15. The rotational position sensor 17 may generate a rotational position output signal conveying rotational position information. The rotational position information may characterize rotational position of an image capture device.

The visual content may be captured by the processor 11 during a capture duration. A video may be generated based on the visual content captured during the capture duration and/or other information. A panning motion of the image capture device during a period within the capture duration may be detected by the processor 11 based on the rotational position information and/or other information. Responsive to detection of the panning motion of the image capture device during the period within the capture duration, a panoramic image may be generated by the processor 11 based on the visual content captured during the period within the capture duration and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to an image capture device, information relating to visual content, visual information, information relating to capture of the visual content, information relating to panning motion, information relating to panoramic images, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic display 14, the image sensor 15, the optical element 16, and/or the rotational position sensor 17 of the system 10 may be carried by the housing of the image capture device. The housing may carry other components, such as the processor 11 and/or the electronic storage 13. References to a housing of an image capture device may refer to the image capture device, and vice versa.

Figure 3:
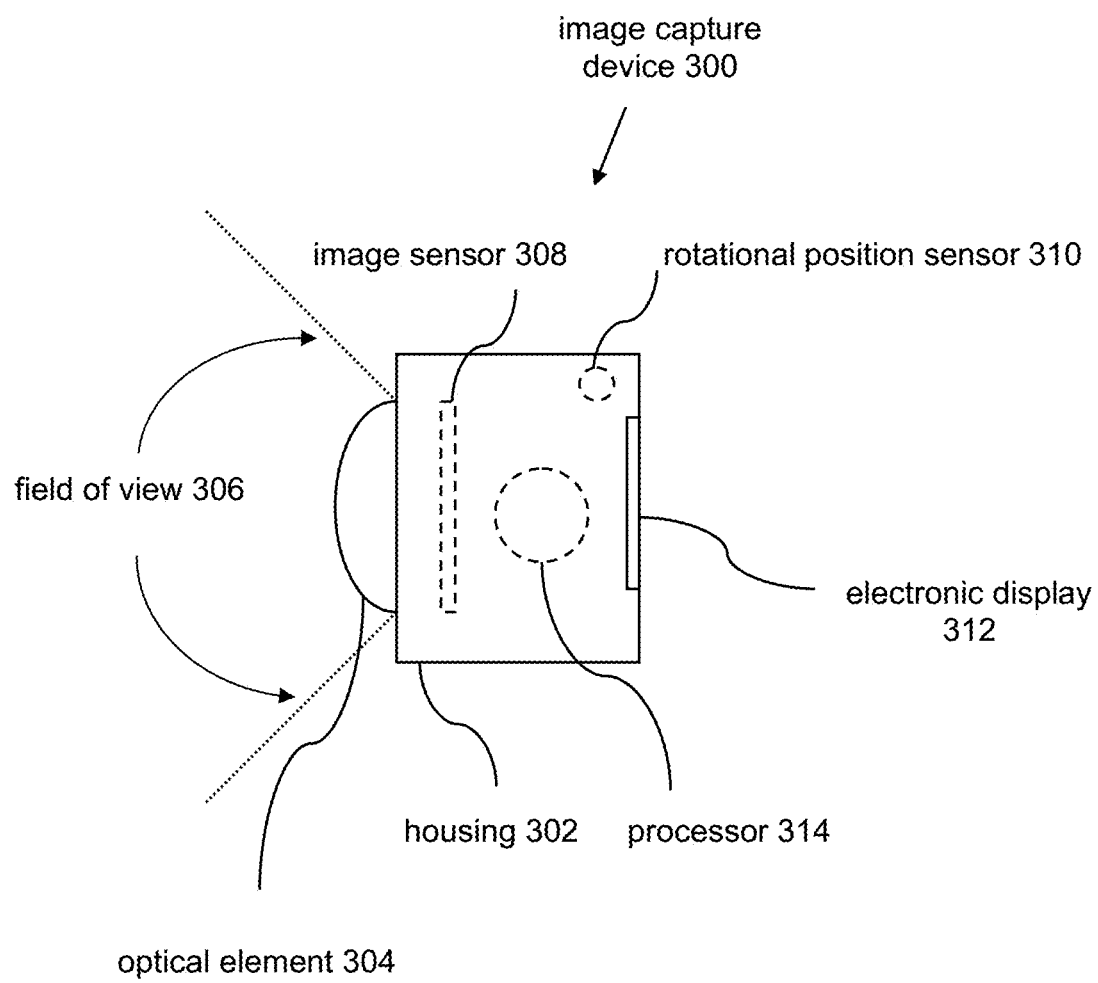
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 300. Visual content (e.g., of image(s), video frame(s)) may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry (be attached to, support, hold, and/or otherwise carry) one or more of an optical element 304, an image sensor 308, a rotational position sensor 310, an electronic display 312, a processor 314, and/or other components.

One or more components of the image capture device 300 may be the same as, be similar to, and/or correspond to one or more components of the system 10. For example, the optical element 304 may be the same as, be similar to, and/or correspond to the optical element 16. The image sensor 308 may be the same as, be similar to, and/or correspond to the image sensor 15. The rotational position sensor 310 may be the same as, be similar to, and/or correspond to the rotational position sensor 17. The electronic display 312 may be the same as, be similar to, and/or correspond to the electronic display 14. The processor 314 may be the same as, be similar to, and/or correspond to the processor 11. The image capture device 300 may include other components not shown in FIG. 3, such as memory (e.g., the electronic storage 13, one or more buffers). The image capture device 300 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 306. The optical element 304 may be configured to guide light within the field of view 306 to the image sensor 308.

The field of view 306 may include the field of view of a scene that is within the field of view of the optical element 304 and/or the field of view of the scene that is delivered to the image sensor 308. For example, the optical element 304 may guide light within its field of view to the image sensor 308 or may guide light within a portion of its field of view to the image sensor 308. The field of view of 306 of the optical element 304 may refer to the extent of the observable world that is seen through the optical element 304. The field of view may have a size. The size of field of view 306 of the optical element 304 may include one or more angles (e.g., vertical angle, horizontal angle, diagonal angle) at which light is received and passed on by the optical element 304 to the image sensor 308. In some implementations, the field of view 306 may be greater than 180-degrees. In some implementations, the field of view 306 may be equal to 180-degrees. In some implementations, the field of view 306 may be smaller than 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 308 may include sensor(s) that converts received light into output signals. The output signals may include electrical signals. The image sensor 308 may generate output signals conveying information that defines visual content of one or more images and/or one or more video frames of a video. For example, the image sensor 308 may include one or more of a charge-coupled device sensor, an active pixel sensor, a complementary metal-oxide semiconductor sensor, an N-type metal-oxide-semiconductor sensor, and/or other image sensors.

The image sensor 308 may be configured generate output signals conveying information that defines visual content of one or more images and/or one or more video frames of a video. The image sensor 308 may be configured to generate a visual output signal and/or other output signals. The visual output signal may convey visual information based on light that becomes incident on the image sensor 308 and/or other information. The visual output signal may convey visual information that defines visual content having a field of view. The optical element 304 may be configured to guide light within the field of view 306 to the image sensor 308, and the image sensor 308 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 308 may include conversion of light received by the image sensor 308 into output signals/visual information defining visual content. Capturing visual content may include encoding, recording, storing, and/or otherwise capturing the visual content for use in generating video content (e.g., content of video frames). For example, during a capture duration, the visual output signal generated by the image sensor 308 and/or the visual information conveyed by the visual output signal may be used to encode, record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The rotational position sensor 310 may include sensor(s) that measures experienced rotational positions and/or rotational motions. The rotational position sensor 310 may convert experienced rotational positions and/or rotational motions into output signals. The output signals may include electrical signals. The rotational position sensor 310 may include one or more accelerometers, one or more gyroscopes, one or more inertial measurement units, and/or other rotational position sensor(s). The rotational position sensor 310 may generate output signals conveying information that characterizes rotational positions (e.g., rotational positions at different moments, rotational motions at different moments) of the rotational position sensor 310 and/or device(s) carrying the rotational position sensor 310, such as the image capture device 300 and/or the housing 302.

For example, the rotational position sensor 310 may be configured to generate a rotational position output signal based on rotational positions of the image capture device 300 during the capture duration. The position output signal may convey rotational position information of the image capture device 300. The rotational position information may characterize rotational position of the image capture device 300 at different moments (points in time, time durations) within the capture duration.

The rotational position information may characterize rotational positions of the image capture device 300 based on specific rotational positions of the image capture device 300 and/or based on changes in rotational positions of the image capture device 300 as a function of progress through the capture duration. That is, the rotational position information may characterize specific rotational positions of the image capture device 300 at different moments and/or changes in rotational positions (motion) of the image capture device 300 (e.g., direction, amount, velocity, acceleration) during the capture duration.

The rotational position information may characterize and/or be used to determine the direction in which the image capture device 300/the optical element 304 is pointed. The rotational position information may characterize and/or be used to determine changes in the direction in which the image capture device 300/the optical element 304 is pointed. For example, the rotational position information may characterize and/or be used to determine the orientation of the image capture device with respect to the ground or gravity, which may be used to determine where the image capture device 300/the optical element 304 is pointed and/or changes in where the image capture device 300/the optical element 304 is pointed. The rotational position information may characterize and/or be used to determine how much of the scene (total field of view) is being captured by the image capture device.

The electronic display 312 may refer to an electronic device that provides visual presentation of information. The electronic display 312 may include a color display and/or a non-color display. In some implementations, the electronic display 312 may include one or more touchscreen displays. The electronic display 312 may be configured to present information. The electronic display 312 may be configured to visually present information. The electronic display may be configured to present one or more previews, visual content, and/or other information.

While the image capture device 300 is shown as having one electronic display, this is merely as an example and is not meant to be limiting. In some implementations, the image capture device may include multiple electronic displays. For example, the image capture device 300 may include a rear-facing electronic display (e.g., the electronic display 316) and a front-facing electronic display. Other arrangements of electronic displays are contemplated.

The processor 310 may include one or more processors (logic circuitry) that provide information processing capabilities in the image capture device 300. The processor 310 may provide one or more computing functions for the image capture device 300. The processor 310 may operate/send command signals to one or more components of the image capture device 300 to operate the image capture device 300. For example, the processor 310 may facilitate operation of the image capture device 300 in capturing image(s) and/or video(s), facilitate operation of the optical element 304 (e.g., change how light is guided by the optical element 304), facilitate operation of the image sensor 308 (e.g., change how the received light is converted into information that defines images/videos and/or how the images/videos are post-processed after capture), and/or facilitate operation of the electronic display 316.

The processor 310 may obtain information from the image sensor 308 and/or the rotational position sensor 310, and/or facilitate transfer of information from the image sensor 308 and/or the rotational position sensor 310 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 300 may capture visual content during a capture duration. The visual content captured during the capture duration may be used to generate a video. The visual content captured during the capture duration may be stored within one or more video files. The image capture device 300 may detect that it is experiencing/undergoing a panning motion (e.g., left-right rotation and/or up-down rotation of the image capture device 300) during a period within the capture duration. Panning of the image capture device may cause the field of view of the scene captured by the image capture device to increase. Based on detection of the panning motion, the image capture device 300 may automatically generate one or more panoramic images using the visual content capture during the period. For example, the image capture device 300 may generate video frames using visual content captured at different moment within the capture duration. When the image capture device 300 is being panned, the video frames may depict different/overlapping parts of the scene. The video frames that depict different/overlapping parts of the scene may be automatically stitched together to generate a panoramic image of the scene.

Referring back to FIG. 1, the processor 11 (or one or more components of the processor 11) may be configured to obtain information to facilitate generating panoramas while recording videos. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a rotational position sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating panoramas while recording videos. The machine-readable instructions 100 may include one or more computer program components. The machine-readable instructions 100 may include one or more of a capture component 102, a panning motion component 104, a panorama component 106, and/or other computer program components.

The capture component 102 may be configured to capture visual content during a capture duration. Capturing visual content during a capture duration may include encoding, recording, storing, and/or otherwise capturing the visual content during the capture duration. The visual content may be captured for use in generating images and/or video frames. The visual content may be captured to generate video frames of one or more videos. For example, the visual content captured during the capture duration may be included and/or used to generate video frames of one or more videos. One or more videos may be generated based on the visual content captured during the capture duration and/or other information. A video may be stored within one or more video files.

For example, during a capture duration, the capture component 102 may use the visual output signal generated by the image sensor 15 and/or the visual information conveyed by the visual output signal to encode, record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks.

In some implementations, information defining the captured visual content may be stored in one or more buffers. Visual content of some or all of the video frames captured during the capture duration may be stored within one or more buffers for temporary storage. Visual content of the video frames captured during the period of the panning motion may be stored within one or more buffers. For example, video frames generated from captured visual content may be stored within a circular buffer. When panning motion of the image capture device is detected, the video frames generated during the panning motion may be retrieved/selected from the buffer for use in generation a panoramic image.

The panning motion component 104 may be configured to detect a panning motion of the image capture device during a period within the capture duration. A period within the capture duration may refer to a duration of time within the capture duration. A period within the capture duration may be shorter than or as long as the capture duration. The panning motion component 104 may detect different/separate panning motions of the image capture device at different periods within the capture duration. A panning motion of the image capture device may refer to movement of the image capture device that changes the direction in which the image capture device is pointed. A panning motion of the image capture device may refer to rotation of the image capture device about its yaw and/or pitch axis. A panning motion of the image capture device may refer to left-right rotation (left to right or right to left) and/or up-down rotation (up to down, or down to up) of the image capture device.

A panning motion of the image capture device may include rotation of the image capture device along a single axis or along multiple axes. A panning motion of the image capture device may include rotation of the image capture device along one direction or along multiple directions. Different panning motion of the image capture device may be used to generate different panoramic images. For example, vertical panning motion may be used to generate a vertical panoramic image. Horizontal panning motion may be used to generate a horizontal panoramic image. Both vertical panning motion and horizontal panning motion may be used to generate a wider panoramic image.

Figure 4A:
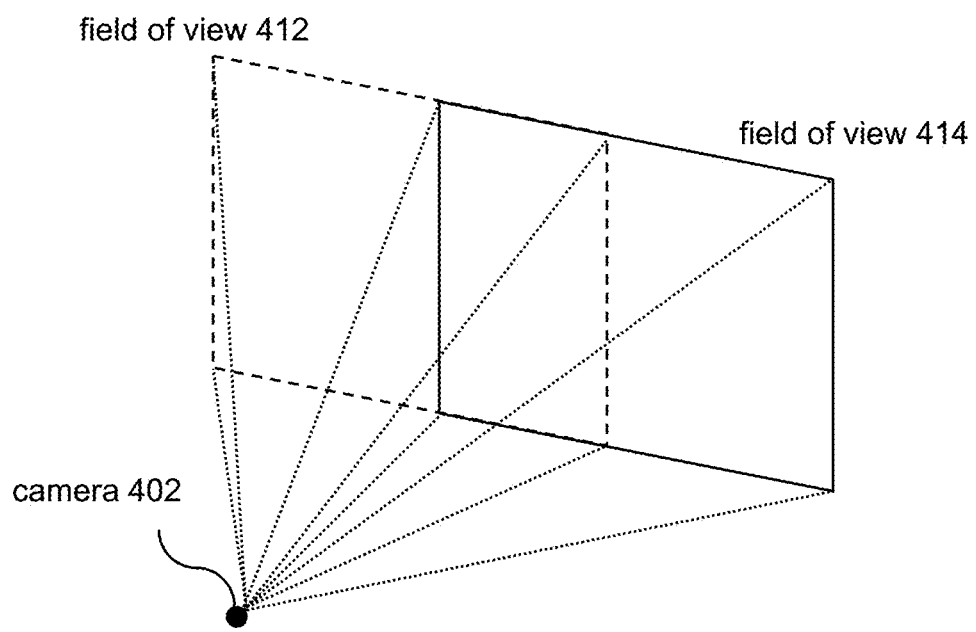
FIG. 4A illustrates an example panning motion of an image capture device.

FIG. 4A illustrates an example panning motion of an image capture device. In FIG. 4A, a camera 402 may be pointed such that a field of view 412 is captured through the lens of the camera 402. The camera 402 may be panned to the right so that a field of view 414 is captured through the lens of the camera 402. Panning of the camera 402 to the right may increase the total field of view of the scene captured by the camera 402. The total field of view of the scene captured by the camera 402 may include combination of the field of view 412 and the field of view 414.

Figure 4B:
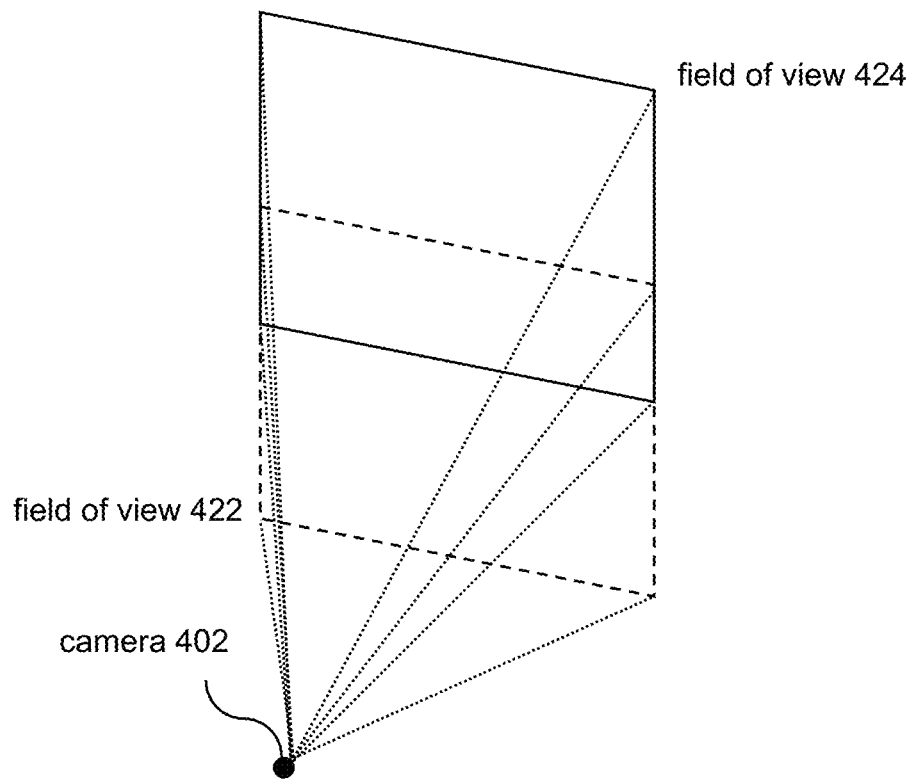
FIG. 4B illustrates an example panning motion of an image capture device.

FIG. 4B illustrates an example panning motion of an image capture device. In FIG. 44, the camera 402 may be pointed such that a field of view 422 is captured through the lens of the camera 402. The camera 402 may be panned upwards so that a field of view 424 is captured through the lens of the camera 402. Panning of the camera 402 upwards may increase the total field of view of the scene captured by the camera 402. The total field of view of the scene captured by the camera 402 may include combination of the field of view 422 and the field of view 424.

Figure 4C:
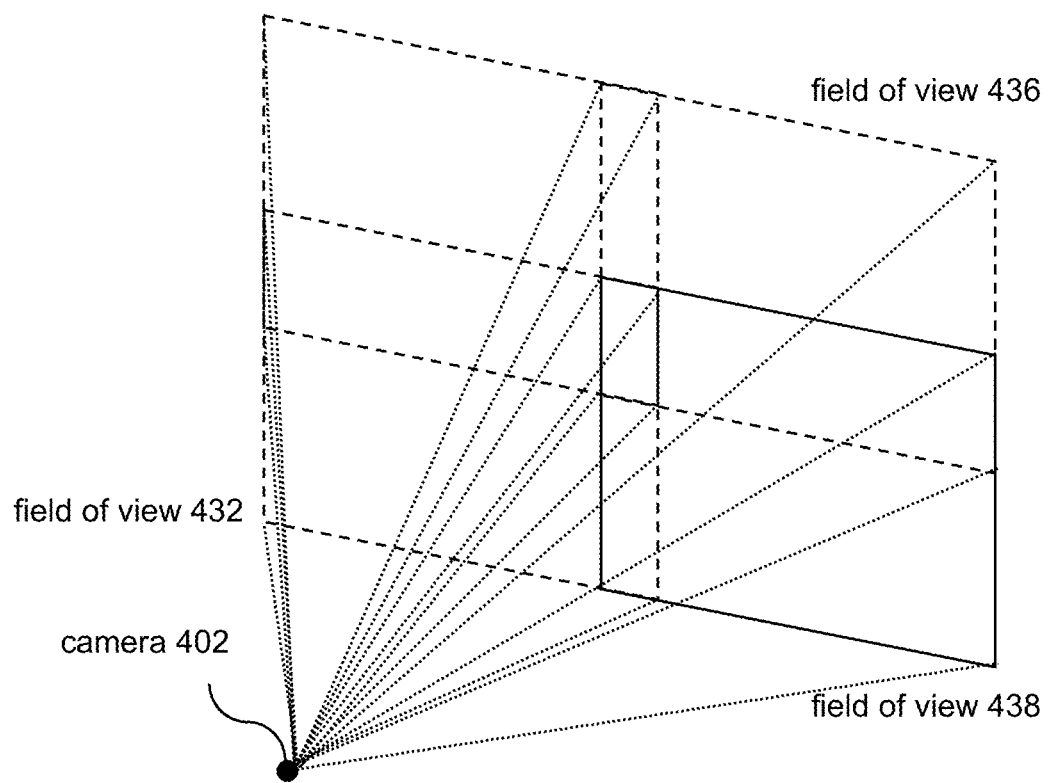
FIG. 4C illustrates an example panning motion of an image capture device.

FIG. 4C illustrates an example panning motion of an image capture device. In FIG. 4C, the camera 402 may be pointed such that a field of view 432 is captured through the lens of the camera 402. The camera 402 may be panned upwards so that a field of view 434 is captured through the lens of the camera 402. The camera 402 may be panned to the right so that a field of view 436 is captured through the lens of the camera 402. The camera 402 may be panned downwards so that a field of view 438 is captured through the lens of the camera 402. Panning of the camera 402 upwards/downwards and left/right may increase the total field of view of the scene captured by the camera 402. The total field of view of the scene captured by the camera 402 may include combination of the fields of view 432, 434, 436, 438. Other panning of image capture device is contemplated.

Detecting a panning motion of the image capture device may include one or more of determining, discerning, discovering, finding, identifying, and/or otherwise detecting the panning motion of the image capture device. Detecting a panning motion of the image capture device may include detecting that the image capture device is experiencing/undergoing the panning motion. Rather than asking the user of the image capture device to perform the panning motion with the image capture device, the panning motion component 104 may automatically detect when the image capture device is experiencing/undergoing the panning motion.

The panning motion of the image capture device may be detected based on the rotational position information and/or other information. For example, the rotational positions of the image capture device characterized by the rotational position information during the capture duration may be used to determine whether or not the image capture device is experiencing/undergoing the panning motion. The rotational positions of the image capture device characterized by the rotational position information during the capture duration may be used to determine the period within the capture duration in which the image capture device is experiencing/undergoing the panning motion. The rotational position information may be used to determine the rotation of the image capture device while the image capture device is capturing the video. The rotational position information may be used to determine the field of view of the scene captured by the image capture device while the image capture device is capturing the video.

Detecting a panning motion of the image capture device may include detecting that the image capture device has experienced or undergone sufficient panning to generate a panoramic image. For example, a panoramic image may be defined by a particular field of view (e.g., 200 degrees horizontally and 90 degrees vertically), and the panning motion may be detected based on the image capture device being panned during video capture such that the total field of view of the scene captured by the image capture device reaches the particular field of view of the panoramic image. For instance, the panning motion may be detected based on the captured video frames in combination covering entirety of the field of view of the panoramic image. The panning motion may be detected based on the captured video frames in combination depicting all parts of the panoramic image.

In some implementations, detection of the panning motion of the image capture device during the period within the capture duration based on the rotational position information may include: determination of a change in a pointing direction of the optical element of the image capture device during the period based on the rotational position information and/or other information; determination of an increase in a total field of view of the visual content captured during the period based on the change in the pointing direction of the optical element and/or other information; and detection of the panning motion of the image capture device based on the increase in the total field of view of the visual content captured during the period and/or other information.

The pointing direction of the optical element of the image capture device may refer to the direction in which the image capture device is pointed for capture of visual content. For example, the pointing direction of the optical element of the image capture device may refer to the center of the field of view of the optical element. The rotational position information may be used to determine in what direction and by what amount the pointing direction has changed during the period. The change in the pointing direction may be used to determine how much of the scene has been captured by the image capture device. The change in the pointing direction may be used to determine in what direction and by what amount the total field of view of the visual content captured by the image capture device has increased.

In some implementations, the panning motion of the image capture device may be detected based on the increase in the total field of view of the visual content captured during the period satisfying a panning motion field of view criteria. The panning motion field of view criteria may refer to a standard/condition for determining whether or not the image capture device has been panned sufficiently to generate a panoramic image. For example, the panning motion field of view criteria may define the field of view (e.g., set field of view, minimum field of view) of the panoramic image to be generated. The field of view of the panoramic image may be defined in terms of one or more dimensions, such as the horizontal dimension, vertical dimension, and/or diagonal dimension. The field of view of the panoramic image may be defined in one or more projections (e.g., equirectangular projection, cylindrical projection, projection with a bijection between a unit sphere crop and image space). Such field of view may be referred to as a panning motion field of view threshold. The increase in the total field of view of the visual content captured during the period may satisfy the panning motion field of view criteria based on the total field of view of the visual content captured during the period being increased to panning motion field of view threshold (e.g., the total captured field of view being equal to the panning motion field of view threshold, the total captured field of view being larger than the panning motion field of view threshold).

In some implementations, detection of the panning motion of the image capture device during the period within the capture duration based on the rotational position information may include: determination of a change in a pointing direction of the optical element of the image capture device during the period based on the rotational position information and/or other information; and detection of the panning motion of the image capture device based on an extent of the change in the pointing direction of the optical element during the period satisfying a panning motion extent threshold. The panning motion extent threshold may be defined by one or more directions of image capture device rotation and/or one or more amounts of image capture device rotation. For example, the rotational position information may be used to determine in what direction and by what amount the pointing direction has changed during the period. A specific amount of rotation of the image capture device in a particular direction may corresponding to a specific increase in the total field of view of the visual content captured by the image capture device. The panning motion extent threshold may refer to the minimum amount of image capture device rotation required to for the image capture device to capture sufficient field of view of the scene for panoramic image generation. Based on the image capture device being rotated to match or exceed the panning motion extent threshold, the panning motion may be detected.

In some implementations, the panning motion may be required to be detected within a certain duration of time. For example, the video frames captured by the image capture device may be stored within a buffer (e.g., circular buffer) of certain size. The panning motion may be required to be detected within a duration of time corresponding to the size of the buffer. For example, the buffer may be capable of storing video frames that make up four-seconds of the video. The total amount of video frames that may be stored in the buffer may make up four seconds of the video. The panning motion may be required to be detected within four-seconds of the capture duration as that is the longest time for which the buffer is storing the video frames.

In some implementations, once the panning motion is detected, the panoramic image of a fixed size may be generated using the video frames stored in the buffer. For example, if the video frames stored within the buffer is able to generate a panoramic image of a fixed size, then the panoramic image of the certain size may be generated.

In some implementations, once the panning motion is detected, the panoramic image of largest size may be generated using the video frames stored in the buffer. For example, if the video frames stored within the buffer is able to generate a panoramic image of a certain size (e.g., minimum size), then the video frames being stored in the buffer may be monitored to determine whether a panoramic image of a larger size may be generated. If new video frame(s) in the buffer increases the size of the panoramic image that may be generated, then panoramic image generation may be delayed. If new video frame(s) in the buffer does not increase the size of the panoramic image that may be generated (e.g., total field of view of the video frames in the buffer decreases; the total field of view of the video frames in the buffer remains the same for a threshold duration), then the panoramic image may be generated.

In some implementations, once the panning motion is detected, the motion of the image capture device may be monitored to create a larger panoramic image. For example, if the video frames stored within the buffer is able to generate a panoramic image of a certain size, then the panoramic image of the certain size may be generated and newly captured video frames may be monitored to determine whether the new video frames may be used to increase the size of the panoramic image. That is, once the initial panoramic image has been generated, newly captured video frames may be checked to see whether the new video frames cover parts of the scene not depicted within the existing panoramic image. If so, then the newly captured video frames may be used to extend the field of view covered by the panoramic image.

The panorama component 106 may be configured to, responsive to detection of the panning motion of the image capture device during the period within the capture duration, generate one or more panoramic images. A panoramic image may refer to an image that has a larger field of view than may be captured from a single, static shot by the image capture device. A panoramic image may refer to an image that includes a panoramic field of view.

A panoramic image may be generated based on the visual content captured during the period of the panning motion within the capture duration and/or other information. For example, the panorama component 106 may generate a panoramic image for individual panning motion detected during the capture duration. By monitoring ego-motion of the image capture device and detecting panning motion during video capture, panoramic image(s) may be automatically generated from the video stream. The panoramic image may have larger field of view and higher resolution than is able to be generated for a single, static shot by the image capture device. One or more panoramic images may be generated during capture of the video. When the video capture is finished, the user may be provided with not just the video but also the panoramic image(s) generated during capture of the video.

A panoramic image corresponding to a panning motion may be generated based on stitching and/or cropping of video frames captured during the panning motion. A panoramic image may be generated using a particular projection, such as equirectangular projection, cylindrical projection, or projection with a bijection between a unit sphere crop and image space. The visual content of different video frames captured during the period may be aligned using the panning motion of the image capture device (characterized or determined from the rotational position information). When video frames are captured at high speed (e.g., 30 frames per second or higher), motion between two consecutive video frames may be small enough that the motion may be sufficiently approximated by rotation and translation effect may be ignored. The rotation may be used to determine the relative positions of the video frames with respect to each other. The visual content of the video frames may be mapped to a 3D sphere using the rotation/relative positions and reprojected to the panoramic image. Warping may be applied to one or more portions of the visual content of different video frames to generate the panoramic image. Blending may be applied to visual content from different video frames to avoid discontinuities in the panoramic image.

In some implementations, a reset time may be used between individual panoramic images that are generated. The reset time may define the amount of time that must pass before a new panning motion is detected and/or a new panoramic image may be generated. The reset time may be used to avoid generation of duplicate/similar panoramic images.

Figure 5:
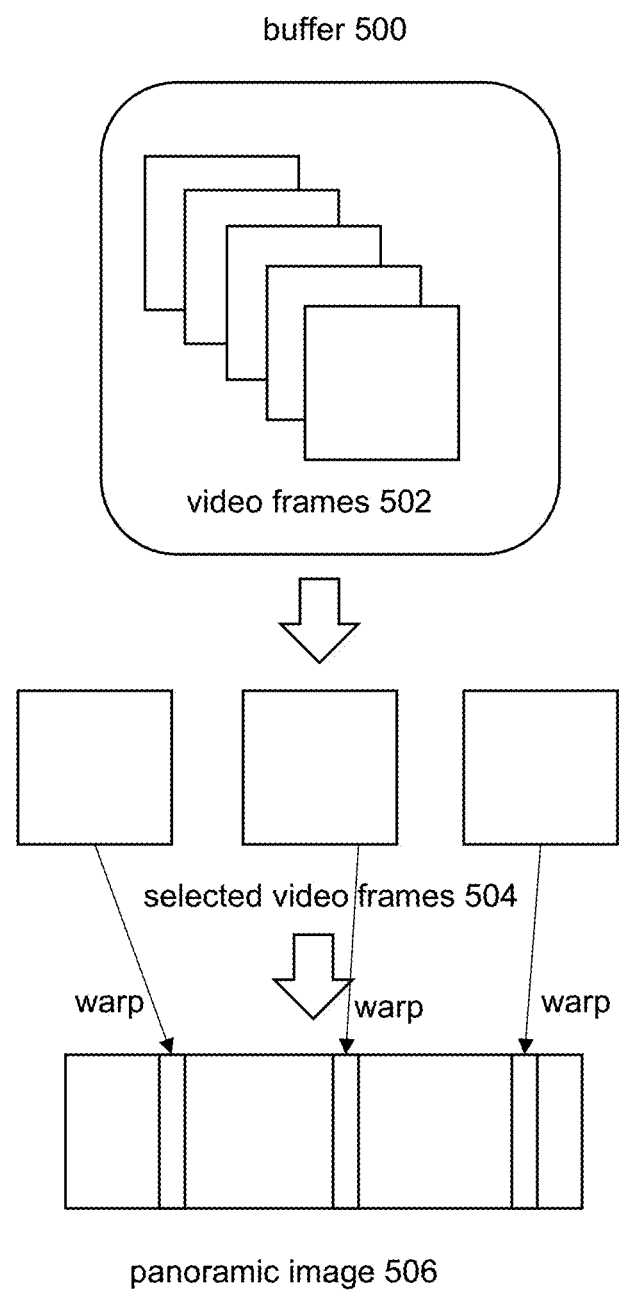
FIG. 5 illustrates an example selection of video frames from a buffer for panorama generation.

FIG. 5 illustrates an example selection of video frames from a buffer for panorama generation. Video frames 502 captured by an image capture device may be stored within a buffer 500. The buffer 500 may temporarily store the latest video frames captured by the image capture device. Based on detection of a panning motion, multiple ones of the video frames 502 may be selected from the buffer 500. For example, when the video frames 502 stored within the buffer 500 cover the field of view of a panoramic image 506 to be generated, multiple ones of the video frames 502 may be selected from the buffer 500. In some implementations, selected video frames 504 may be stored within a different buffer. For example, the buffer 500 may be used to store the latest video frames captured by the image capture device, and another buffer may be used to store the video frames selected from the buffer 500 for use in generating a panoramic image.

The selected video frames 504 may be used to generate the panoramic image 506. For example, FIG. 5 shows three video frames that have been selected to provide visual content for three portions (tiles) of the panoramic image 506. The visual content portions extracted from the three video frames may be warped to provide continuity between visual content from different video frames. The panoramic image 506 may be filled by selecting and warping pixels from the selected video frames 504. If the video frames 502 stored within the buffer 500 do not cover the field of view of a panoramic image 506 to be generated, new video frames may be captured and stored within the buffer 500.

A video frame may be selected from the buffer 500 based on the video frame including depiction of the scene to be included within the panoramic image 506. For example, a video frame may be selected from the buffer 500 based on the video frame including pixels that may be used to fill a portion (e.g., a tile) of the panoramic image 506. For instance, for a portion of the panoramic image 506, the video frames 502 within the buffer 500 may be checked to determine whether the video frames 502 include all pixels needed for the portion (e.g., whether the field of view of the video frames 502 cover the perimeter of the portion). Multiple video frames may satisfy this criteria and a set of possible video frames may be identified for different portions of the panoramic image 506. To match one video frame per a portion of the panoramic image 506, one or more factors may be considered. For example, a video frame may be matched to a portion of the panoramic image 506 based on where the portion of the panoramic image 506 is located within the video frames. If the pixels are pulled from edge of the video frame for inclusion in the panoramic image 506, then the likelihood of deformation/scaling increases. Thus, matching between the potential video frames and the portion of the panoramic image 506 may prefer/favor video frames that include pixels for the portion within/near center of the video frame.

Additionally and/or alternatively, matching between the potential video frames and the portion of the panoramic image 506 may prefer/favor consecutive video frames. Non-rotational motion and exposure changes become more drastic with increase in temporal gap between the video frames. Selection of non-consecutive video frames may increase the likelihood of misalignment within the panoramic image 506. By selecting consecutive video frames for adjacent portions of the panoramic image 506, misalignment within the panoramic image 506 may be reduced.

Figure 6:
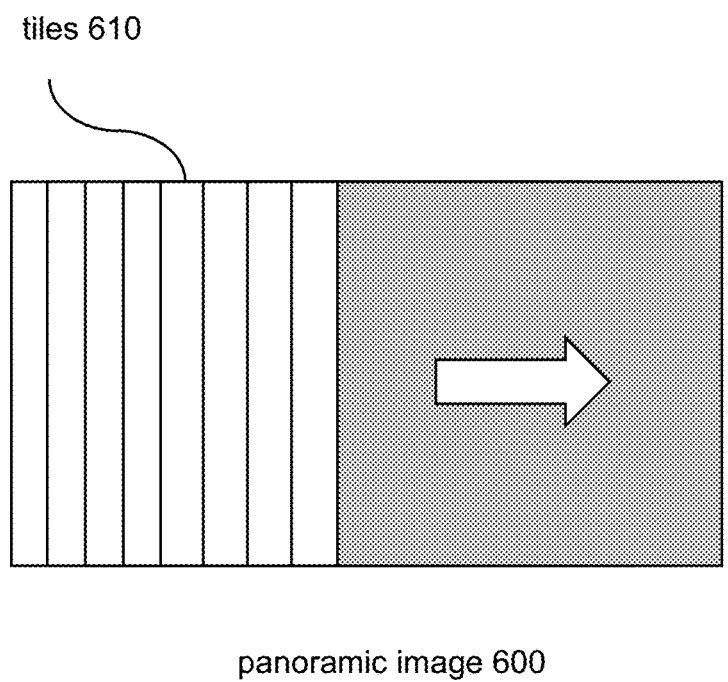
FIG. 6 illustrates example tiles for generating a panoramic image.

FIG. 6 illustrates example tiles 610 for generating a panoramic image 600. Pixels for the tiles 610 may be obtained (e.g., extracted, pulled) from video frames stored within a buffer (e.g., the buffer 500 shown in FIG. 5). The pairing of video frames and tiles 610 may be performed such that consecutive video frames are selected for adjacent tiles. For example, if Nth video frames is selected for a tile, then N−1 or N+1 video frame may be selected for the next/adjacent tile. Selection of consecutive video frames may reduce local motion/residual motion within the panoramic image 600.

In some implementations, the tiles 610 of the panoramic image 600 may include overlap between adjacent tiles. For example, the second tile from the left may include overlap on the left side with the first tile from the left and may include overlap on the right side with the third tile from the left.

In some implementations, blending may be performed between tiles. Warping of pixels for inclusion in different tiles 610 of the panoramic image 610 may result in geometric artifacts, such as cut lines and/or shifted textures. Such geometric artifacts may be caused from treating motion between video frames as purely rotational. The geometric artifacts may be reduced using blending (e.g., alpha blending) between the tiles. Blending of pixels from neighboring tiles may smooth discontinuities between the neighboring tiles. For example, for an individual tile, pixels on left and right of the tile may be warped and the overlap region between the tiles may be merged using a weighted average, where the weight varies perpendicularly to the stitch line.

In some implementations, absence of motion blur within the visual content may be used as criteria to trigger panoramic image generation. For example, generation of the panoramic image(s) may not be performed based on detection of motion blur within the visual content captured during the period within the capture duration and/or other information. Motion blur may refer to streaking and/or smearing of visual content captured by the image capture device due to motion of the image capture device during capture. For example, the rotational position information of the image capture device may be used to determine how the image capture device is being rotated, and motion blur within the visual content may be detected based on the rotation of the image capture device (e.g., the speed of rotation). The amount of motion blur within the visual content may be deterred based on the motion of the image capture device and the exposure time used by the image capture device to capture the visual content. Panoramic image may not be generated from visual content with motion blur.

In some implementations, absence of local motion within the visual content may be used as criteria to trigger panoramic image generation. For example, generation of the panoramic image(s) may not be performed based on detection of local motion within the visual content captured during the period within the capture duration and/or other information. Local motion may refer to depiction of object moving across multiple video frames. Presence of local motion may result in misalignment within the panoramic image. Motion estimation may be used to identify when local motion is present within the visual content. Location motion may be detected within the visual content based on the visual motion field (e.g., computed directly on image pixels by a specific block) not matching (e.g., not agreeing with, not being the same as, differing by more than a threshold amount) the theoretical motion field computed from the motion of the image capture device (e.g., measured rotation of the image capture device). Panoramic image may not be generated from visual content with local motion.

In some implementations, one or more previews of the panoramic image(s) may be presented on the electronic display(s) during generation of the panoramic image(s). For example, when a panning motion is detected during video capture to trigger generation of a panoramic image, the panoramic image may be presented on the electronic display(s). For example, the image capture device may be recording a video and showing a preview of the video being recorded on an electronic display. When a panning motion of the image capture device is detected, the image capture device may generate the panoramic image and present the panoramic image on the electronic display. In some implementations, the preview of the panoramic image may be presented for a duration of time, and the image capture device may switch the preview on the electronic display back to presenting the preview of the video being recorded.

In some implementations, a preview of a panoramic image may be dynamic. The preview of the panoramic image may show changes in the panoramic image generation. For example, the field of view of the panoramic image may increase with more panning motion of the image capture device, and the preview may show the panoramic image becoming larger.

Figure 7:
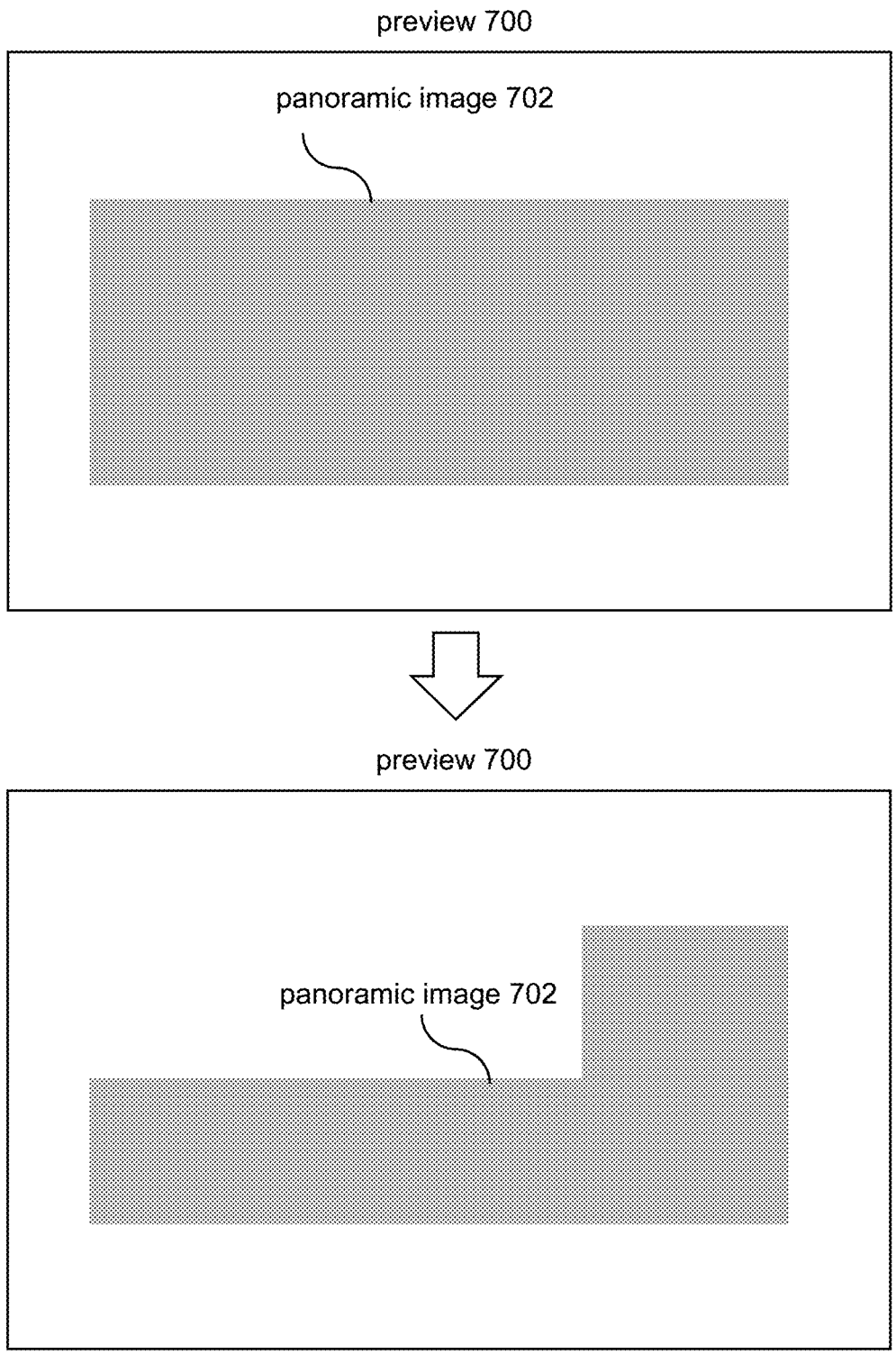
FIG. 7 illustrates an example preview of a panoramic image.

FIG. 7 illustrates an example preview 700 of a panoramic image 702. The preview may show a preview of the panoramic image 702 that has been generated by an image capture device during video capture. The image capture device may be rotated further during video capture to increase the field of view of the panoramic image 702. The preview 700 of the panoramic image 702 may be updated to show the changes in the panoramic image 702. For example, as shown in FIG. 7, the size of the panoramic image may have been increased based on the image capture device being rotated to the right and then upwards. The zoom level of the preview 700 may change with change in the panoramic image 702. For example, the zoom level of the preview 700 may change to show the entirety of the panoramic image 702. Such preview of the panoramic image/generation of the panoramic image may enable the user to identify which parts of the scene the user may wish to add to the panoramic image. In some implementations, the unfilled (blank) portions of the panoramic image 702 may be highlighted (e.g., shown in black/color) to guide the user in generation of the panoramic image 702. In some implementations, the current field of view seen through the image capture device may be indicated within the preview to guide the user in generation of the panoramic image 702.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
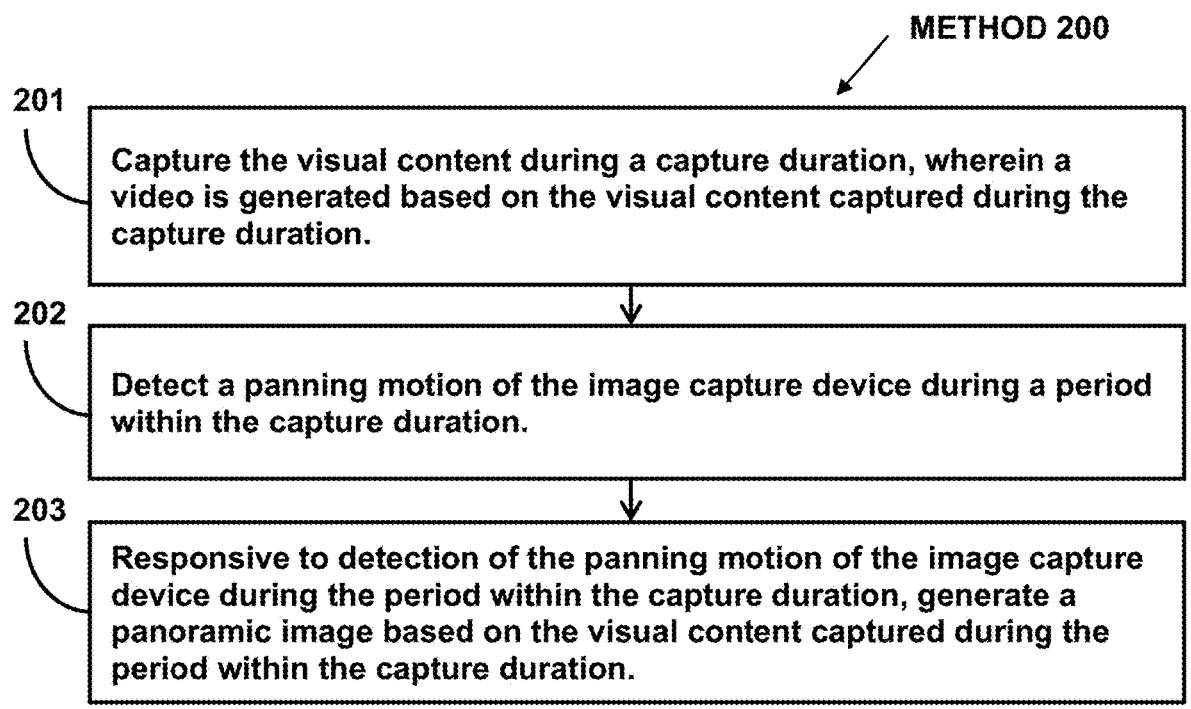
FIG. 2 illustrates an example method for generating panoramas while recording videos.

FIG. 2 illustrates method 200 for generating panoramas while recording videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, An image capture device may include one or more of an image sensor, an optical element, a rotational position sensor, a processor, and/or other components. The image sensor may generate a visual output signal conveying visual information based on light that becomes incident thereon. The visual information may define visual content. The optical element may guide light within a field of view to the image sensor. The rotational position sensor may generate a rotational position output signal conveying rotational position information. The rotational position information may characterize rotational position of the image capture device.

At operation 201, the visual content may be captured during a capture duration. A video may be generated based on the visual content captured during the capture duration and/or other information. In some implementations, operation 201 may be performed by a processor component the same as or similar to the capture component 102 (Shown in FIG. 1 and described herein).

At operation 202, a panning motion of the image capture device during a period within the capture duration may be detected based on the rotational position information and/or other information. In some implementations, operation 202 may be performed by a processor component the same as or similar to the panning motion component 104 (Shown in FIG. 1 and described herein).

At operation 203, responsive to detection of the panning motion of the image capture device during the period within the capture duration, a panoramic image may be generated based on the visual content captured during the period within the capture duration and/or other information. In some implementations, operation 202 may be performed by a processor component the same as or similar to the panorama component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating panoramas while recording videos, the image capture device comprising:
   a housing;
   an image sensor carried by the housing and configured to generate a visual output signal conveying visual information based on light that becomes incident thereon, the visual information defining visual content;
   an optical element carried by the housing and configured to guide light within a field of view to the image sensor;
   a rotational position sensor carried by the housing and configured to generate a rotational position output signal conveying rotational position information, the rotational position information characterizing rotational position of the image capture device; and
   one or more physical processors carried by the housing, the one or more physical processors configured by machine-readable instructions to:
   record a video based on the visual content captured during a capture duration; and;
   while recording the video, automatically generate a panoramic image based on the visual content captured during a period within the capture duration, wherein automatic generation of the panoramic image includes:
      detection of a panning motion of the image capture device during the period within the capture duration based on the rotational position information, wherein the visual content captured during the period is stored within a buffer, the panning motion is required to be detected within a duration of time corresponding to a size of the buffer for the panoramic image to be automatically generated while recording the video, and wherein the detection of the panning motion of the image capture device during the period within the capture duration based on the rotational position information includes:
         determination of a change in a pointing direction of the optical element during the period based on the rotational position information;
         determination of an increase in a total field of view of the visual content captured during the period based on the change in the pointing direction of the optical element; and
         detection of the panning motion of the image capture device based on the increase in the total field of view of the visual content captured during the period; and
      responsive to detection of the panning motion of the image capture device during the period within the capture duration, generation of the panoramic image based on the visual content captured during the period within the capture duration.

2. The image capture device of claim 1, wherein the automatic generation of the panoramic image is not performed based on detection of motion blur or local motion within the visual content captured during the period within the capture duration.

3. The image capture device of claim 1, wherein the panning motion of the image capture device is detected based on the increase in the total field of view of the visual content captured during the period satisfying a panning motion field of view criteria.

4. The image capture device of claim 1, further comprising an electronic display carried by the housing, wherein:

a preview of the video being recorded is presented on the electronic display;

the preview of the video on the electronic display is switched to show a preview of the panoramic image during the automatic generation of the panoramic image; and the preview of the panoramic image on the electronic display is switched back to show the preview of the video being recorded.

5. An image capture device for generating panoramas while recording videos, the image capture device comprising:

a housing;

an image sensor carried by the housing and configured to generate a visual output signal conveying visual information based on light that becomes incident thereon, the visual information defining visual content;

an optical element carried by the housing and configured to guide light within a field of view to the image sensor;

a rotational position sensor carried by the housing and configured to generate a rotational position output signal conveying rotational position information, the rotational position information characterizing rotational position of the image capture device; and one or more physical processors carried by the housing, the one or more physical processors configured by machine-readable instructions to:

record a video based on the visual content captured during a capture duration; and while recording the video, automatically generate a panoramic image based on the visual content captured during a period within the capture duration, wherein automatic generation of the panoramic image includes:

detection of a panning motion of the image capture device during the period within the capture duration based on the rotational position information; and responsive to detection of the panning motion of the image capture device during the period within the capture duration, generation of the panoramic image based on the visual content captured during the period within the capture duration;

wherein:

the visual content captured during the period is stored within a buffer; and the panning motion is required to be detected within a duration of time corresponding to a size of the buffer for the panoramic image to be automatically generated while recording the video.

6. The image capture device of claim 5, wherein the detection of the panning motion of the image capture device during the period within the capture duration based on the rotational position information includes:

determination of a change in a pointing direction of the optical element during the period based on the rotational position information;

determination of an increase in a total field of view of the visual content captured during the period based on the change in the pointing direction of the optical element; and detection of the panning motion of the image capture device based on the increase in the total field of view of the visual content captured during the period.

7. The image capture device of claim 6, wherein the panning motion of the image capture device is detected based on the increase in the total field of view of the visual content captured during the period satisfying a panning motion field of view criteria.

8. The image capture device of claim 7, wherein the increase in the total field of view of the visual content captured during the period satisfies the panning motion field of view criteria based on the total field of view of the visual content captured during the period being increased to a panning motion field of view threshold.

9. The image capture device of claim 8, wherein the detection of the panning motion of the image capture device during the period within the capture duration based on the rotational position information includes:

determination of a change in a pointing direction of the optical element during the period based on the rotational position information; and detection of the panning motion of the image capture device based on an extent of the change in the pointing direction of the optical element during the period satisfying a panning motion extent threshold.

10. The image capture device of claim 5, wherein the automatic generation of the panoramic image is not performed based on detection of motion blur within the visual content captured during the period within the capture duration.

11. The image capture device of claim 5, wherein the automatic generation of the panoramic image is not performed based on detection of local motion within the visual content captured during the period within the capture duration.

12. The image capture device of claim 5, further comprising an electronic display carried by the housing, wherein:

a preview of the video being recorded is presented on the electronic display;

the preview of the video on the electronic display is switched to show a preview of the panoramic image during the automatic generation of the panoramic image; and the preview of the panoramic image on the electronic display is switched back to show the preview of the video being recorded.

13. A method for generating panoramas while recording videos, the method performed by an image capture device including one or more processors, an image sensor configured to generate a visual output signal conveying visual information based on light that becomes incident thereon, the visual information defining visual content, an optical element configured to guide light within a field of view to the image sensor, a rotational position sensor configured to generate a rotational position output signal conveying rotational position information, the rotational position information characterizing rotational position of the image capture device, the method comprising:

recording a video based on the visual content captured during a capture duration; and while recording the video, automatically generating a panoramic image based on the visual content captured during a period within the capture duration, wherein automatic generation of the panoramic image includes:

detecting, by the image capture device, a panning motion of the image capture device during the period within the capture duration based on the rotational position information; and responsive to detection of the panning motion of the image capture device during the period within the capture duration, generating, by the image capture device, the panoramic image based on the visual content captured during the period within the capture duration;

wherein:
the visual content captured during the period is stored within a buffer; and
the panning motion is required to be detected within a duration of time corresponding to a size of the buffer for the panoramic image to be automatically generated while recording the video.

14. The method of claim 13, wherein detecting the panning motion of the image capture device during the period within the capture duration based on the rotational position information includes:
determining a change in a pointing direction of the optical element during the period based on the rotational position information;
determining an increase in a total field of view of the visual content captured during the period based on the change in the pointing direction of the optical element; and
detecting the panning motion of the image capture device based on the increase in the total field of view of the visual content captured during the period.

15. The method of claim 14, wherein the panning motion of the image capture device is detected based on the increase in the total field of view of the visual content captured during the period satisfying a panning motion field of view criteria.

16. The method of claim 15, wherein the increase in the total field of view of the visual content captured during the period satisfies the panning motion field of view criteria based on the total field of view of the visual content captured during the period being increased to a panning motion field of view threshold.

17. The method of claim 13, wherein detecting the panning motion of the image capture device during the period within the capture duration based on the rotational position information includes:
determining a change in a pointing direction of the optical element during the period based on the rotational position information; and
detecting the panning motion of the image capture device based on an extent of the change in the pointing direction of the optical element during the period satisfying a panning motion extent threshold.

18. The method of claim 13, wherein automatically generating the panoramic image is not performed based on detection of motion blur within the visual content captured during the period within the capture duration.

19. The method of claim 13, wherein automatically generating the panoramic image is not performed based on detection of local motion within the visual content captured during the period within the capture duration.

20. The method of claim 13, wherein:
the image capture device further comprises an electronic display;
a preview of the video being recorded is presented on the electronic display;
the preview of the video on the electronic display is switched to show a preview of the panoramic image during the automatic generation of the panoramic image; and the preview of the panoramic image on the electronic display is switched back to show the preview of the video being recorded.

* * * * *